Nov. 24, 1936.  G. E. McLAGAN  2,061,772
SLIP
Filed April 4, 1936  2 Sheets-Sheet 1
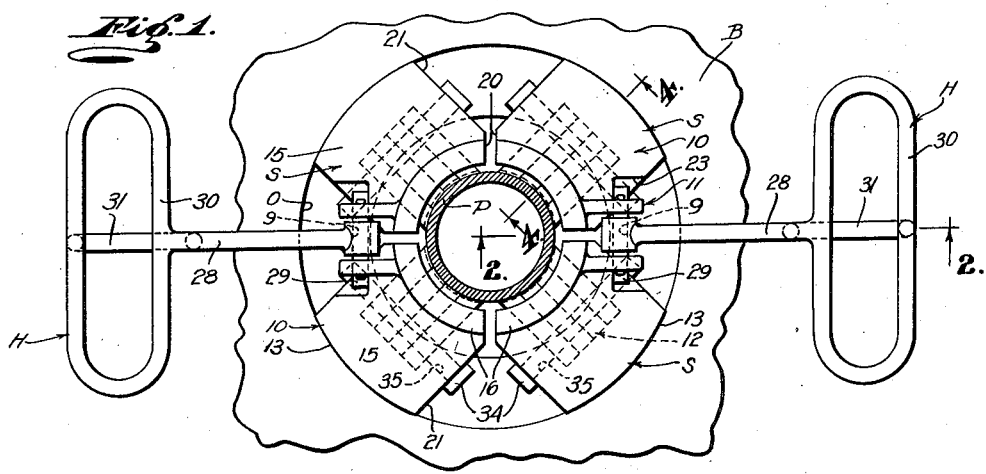
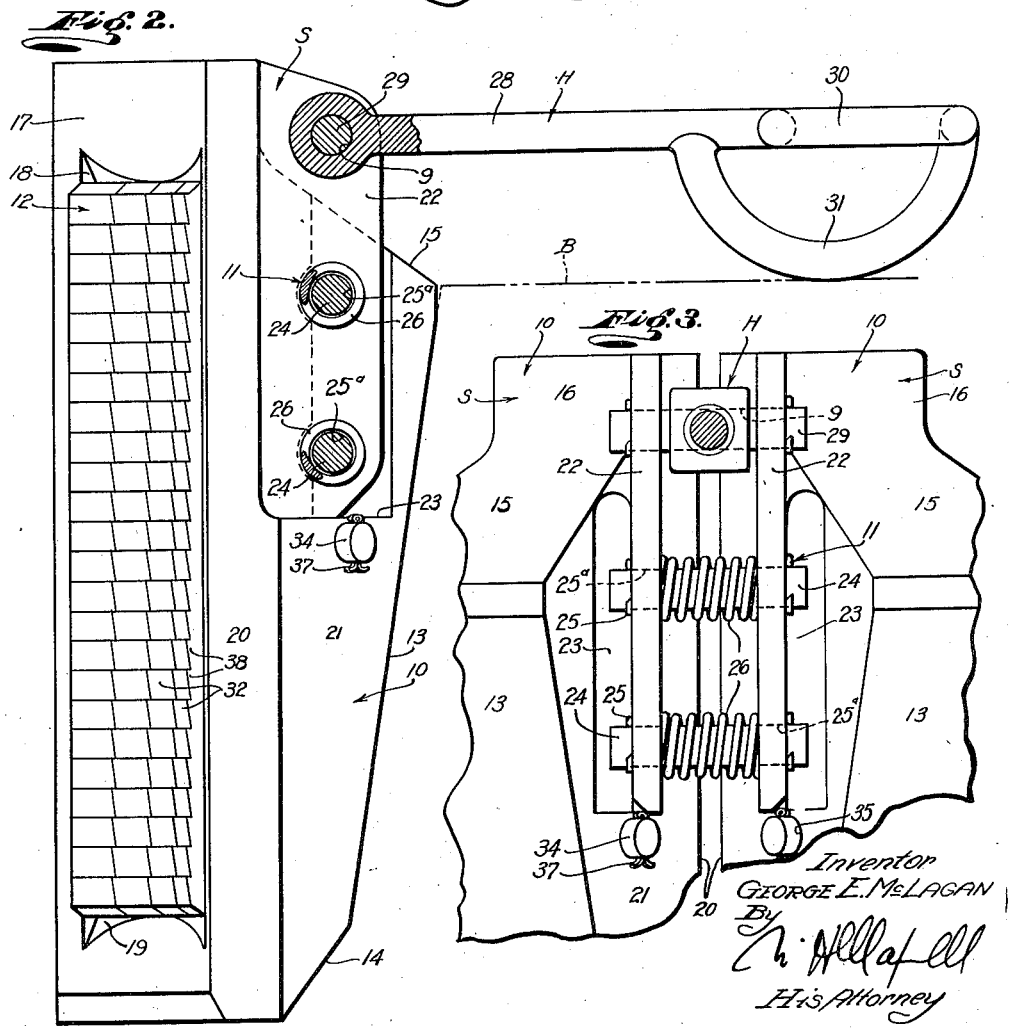
Inventor
GEORGE E. McLAGAN
By
His Attorney Nov. 24, 1936.   G. E. McLAGAN   2,061,772
SLIP
Filed April 4, 1936   2 Sheets-Sheet 2
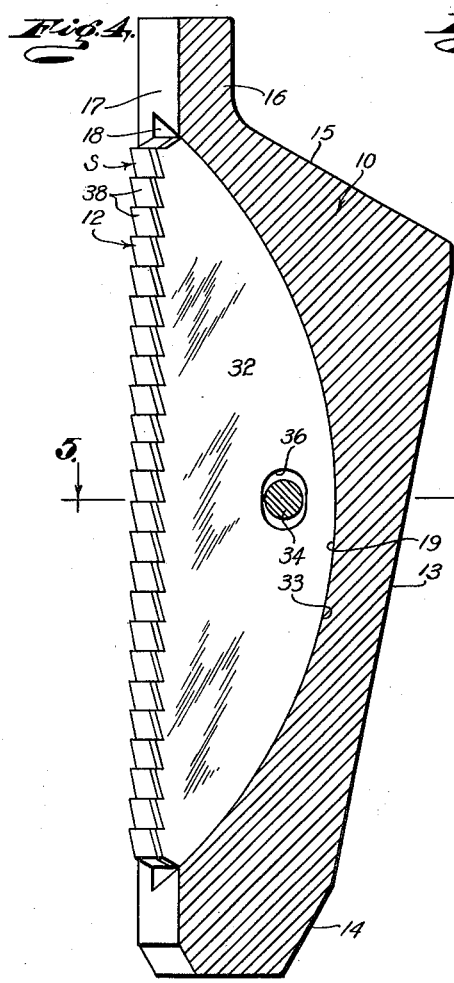
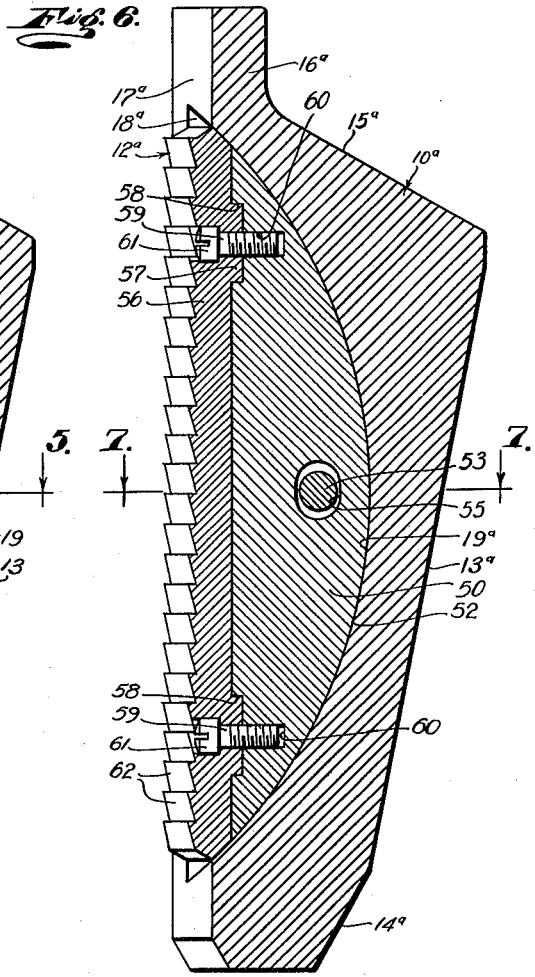
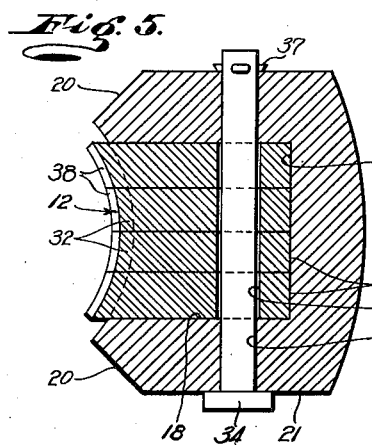
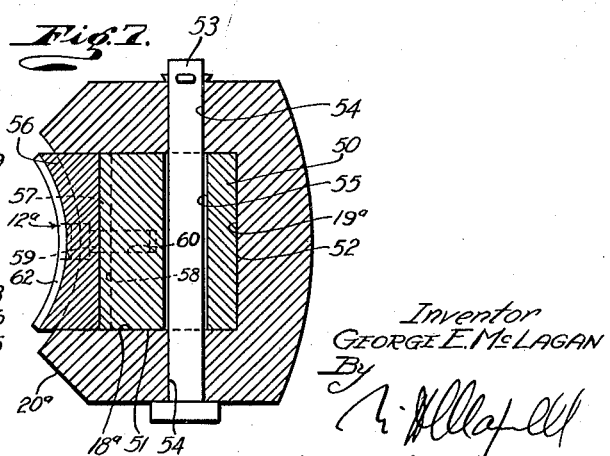
Inventor
GEORGE E. McLAGAN
By
His Attorney Patented Nov. 24, 1936

2,061,772

UNITED STATES PATENT OFFICE 2,061,772

SLIP

George E. McLagan, Monterey Park, Calif.

Application April 4, 1936, Serial No. 72,728

14 Claims. (Cl. 24—263)

This invention has to do with apparatus for drilling wells and has particular reference to slips for use in the rotary table of a well drilling rig. A general object of this invention is to provide practical, effective, self-adjusting tubing and pipe gripping slips for use in a rotary table.

An important object of the present invention is to provide slips for use in a rotary table that are operable to obtain uniform, extensive and, therefore, effective gripping engagement with the pipe even though the rotary table bushing in which they are seated is worn or irregular, or the rotary table is not truly horizontal.

Another object of the invention is to provide slips of the character mentioned that embody self-equalizing and self-adjusting gripping elements that are adapted to uniformly and dependably grip the pipe under normal operating conditions as well as under unfavorable conditions such as situations where the tapered slip receiving opening of the rotary table bushing is worn and situations where the rotary table is not horizontal.

Another object of the invention is to provide slips of the character mentioned that each include body sections connected for limited relative movement so that they may individually shift to properly conform to and bear on the rotary table bushing and gripping elements carried by the slip body sections to rock or move to positions where they obtain full uniform gripping contact with the tubing or pipe.

Another object of the invention is to provide rotary table slips having gripping parts that are formed, disposed and related so that they evenly distribute the gripping forces on the pipe and do not score or form grooves in the pipe.

Another object of the invention is to provide slips of the character mentioned embodying rockable or shiftable gripping elements that are readily removable for sharpening or replacement.

A still further object of the invention is to provide slips of the character mentioned that are easy and convenient to handle and that are inexpensive of manufacture.

The various objects and features of my invention will be fully understood from the following detailed description of typical forms and applications of the invention, throughout which description reference is made to the accompanying drawings, in which:

Fig. 1 is a top or plan view of a typical rotary table bushing illustrating a set of slips of the present invention seated in the bushing and engaging about a pipe. Fig. 2 is an enlarged vertical detailed sectional view of one of the slips illustrated in Fig. 1, being a view taken substantially as indicated by line 2—2 on Fig. 1. Fig. 3 is a fragmentary elevation view of the outer side of one of the slips illustrating the means connecting the slip sections. Fig. 4 is an enlarged vertical detailed sectional view taken as indicated by line 4—4 on Fig. 1. Fig. 5 is a transverse detailed sectional view taken as indicated by line 5—5 on Fig. 4. Fig. 6 is a view similar to Fig. 4 illustrating another form of the invention, and Fig. 7 is a transverse or horizontal detailed sectional view taken as indicated by line 7—7 on Fig. 6.

The slips of the present invention are adapted to be employed or arranged in a bushing of a rotary table to grip a pipe or a string of pipe extending through the table. In Fig. 1 of the drawings I have illustrated one embodiment of the invention comprising a pair of slips S arranged in a rotary table bushing B. The opening O in the bushing B for carrying the slips S is tapered or of downwardly diminishing diameter. The bushing B may be considered as arranged in a rotary table (not shown). While the invention is disclosed as embodied in a pair of slips S it is to be understood that the invention may be embodied in sets of slips of three, four, or more, each. As the slips S are identical we will proceed with a detailed description of one slip S, it being understood that such description may apply equally well to the other slip.

Each slip S of the form of the invention illustrated in Figs. 1 to 5, inclusive, of the drawings, includes generally, two body sections 10, means 11 connecting the sections 10 for limited relative movement and self-adjusting gripping elements 12 carried by the sections 10 for gripping a pipe P extending through the bushing B.

The slip sections or body sections 10 are connected by the means 11 so that they are adapted to be handled as a single unit or slip S to be arranged or seated in the opening O of the rotary table bushing B. The sections 10 are alike and each have a convex and downwardly and inwardly inclined outer surface 13 adapted to seat or bear on the wall of the bushing opening O. The outer lower corners 14 of the sections 10 may be bevelled or inclined as illustrated in Figs. 2 and 4 of the drawings. The body sections 10 are adapted to project above the upper surface of the bushing B and their upper ends 15 may incline upwardly from the upper end of the surfaces 13 to substantially cylindrically curved vertical flanges 16. The inner surfaces or sides 17 of the sections 10 are cylindrically concaved or curved about a vertical axis which may be substantially coincident with the longitudinal axis of the bushing opening O, considering the slips to be in position in the bushing. The inner sides or surfaces of the flanges 16 comprise continuations of the inner body surfaces 17.

In accordance with the invention a socket or recess 18 is provided in the inner side of each slip section or body section 10. The recesses 18 are provided to carry the gripping elements 12 and their inner walls 19 are concave and curved about horizontal axes. The inner walls 19 of the recesses 18 may be cylindrically curved as clearly illustrated in Fig. 4 of the drawings, and may be curved throughout their lengths. The opposite side walls of the recesses 18 are preferably flat and vertical. The recesses 18 are suitably spaced between the upper and lower extremities of the sections 10 and the opposite longitudinal sides of the sections 10. Each vertical end or side of the sections 10 has a surface 20 extending outwardly from the curved inner surface 17 that is substantially radial relative to the vertical axis of the bushing opening O. The surfaces 20 extend between the upper and lower ends of the sections 10 and the surfaces 20 on the outermost sides of the sections may cooperate with the surfaces 20 occurring on the outermost sides of the connected sections 10 forming the other slip S. The major portions 21 of the vertical ends or sides of the sections 10 may be straight and parallel, as illustrated, to lighten the weight of the slip S.

The means 11 is provided to connect the two body sections 10 whereby they may be handled as a single unit to comprise one of the slips S. The means 11 is best illustrated in Figs. 2 and 3 of the drawings. The means 11 connects the two sections 10 so that they may shift or move horizontally relative to one another during use. The means 11 includes a vertical or longitudinally extending rib 22 on each section 10. The ribs 22 are provided on the outer upper portions of the sections 10, which are cut away or relieved as at 23 so that the ribs 22 do not interfere with the bushing B, and are located relatively close to the adjacent inner parts of the two connected sections 10. The ribs 22 are preferably integral with the sections 10 and may extend downwardly from the upper ends of the flanges 16. The connecting means 11 includes spaced connecting members in the form of bolts or pins 24 slidably received in horizontal openings 25ᵃ in the ribs 22 of the two sections. In the particular construction illustrated there are two vertically spaced pins 24. Keys 25 extend through openings in the pins 24 and are adapted to engage the outer sides of the ribs 22 to limit the relative outward movement between the sections 10. The parts are related so that the sections 10 may have the desired limited relative horizontal play or movement.

Coiled springs 26 surround the pins 24 and are arranged under compression between the ribs 22 to yieldingly resist movement of the body sections 10 toward one another and to normally urge the sections apart. The springs 26 are normally under compression to exert outward pressures on the sections 10. The spaced pins 24 cooperating with the openings 25ᵃ prevent relative vertical movement between the sections 10 and relative rocking and twisting of the sections. The sections 10 connected as just described are adapted to individually conform to and seat themselves in the opening O of the bushing B.

A handle H is provided for facilitating the handling of the slip S. The handle H includes a stem or shank 28 extending outwardly from between the upper end portions of the ribs 22. A pin 29 passes through horizontally aligned openings in the ribs 22 and passes through an opening 9 in an enlarged inner end of the handle shank 28 to pivotally connect the handle with the section 10. A head 30 is provided on the outer end of the shank 28. The head 30 may be in the form of an elongated loop to project laterally in opposite directions from the shank 28. One or more downwardly bowed rests 31 are provided on the head 30 to engage the bushing B or the rotary table to space the head 30 therefrom so that it may be easily grasped or engaged. The handle H is adapted to be moved or swung to any desired or suitable position.

The gripping elements 12 are shiftably arranged in the recesses 18 to project from the inner sides 17 of the body sections 10 for the purpose of engaging and gripping the pipe P. In the form of the invention being described the gripping elements 12 are laminated, each comprising assemblies of a plurality of plate-like members 32. The members 32 are substantially alike and are arranged in the recesses 18 in side by side relation. The members 32 of the gripping elements 12 extend vertically or longitudinally through the recesses 18 and the outermost members of the assemblies are adapted to bear on or engage the vertical side walls of the recesses. In accordance with the invention the members 32 are shaped to rock or move in the recesses 18, so that their outer pipe engaging edges or parts are adapted to assume various positions with respect to the sections 10 to properly engage the pipe P, which is normally vertical. The inner edges 33 of the members 32 are curved or convex to readily shift or move on the concave walls 19 of the recesses 18. The edges 33 are preferably curved throughout their lengths or longitudinal extents and the curvature of the edges 32 may be substantially the same as or slightly less than the radius of curvature of the recess walls 19 so that they may evenly bear and move on the walls.

In the particular form of the invention being described the members 32 are each integral and are proportioned to have their outer edge portions project beyond the inner surfaces 17 of the body sections 10. Means is provided for limiting the movement of the gripping members 32 relative to the body sections 10 and for preventing the loss and displacement of the members from the recesses 18. A bolt or pin 34 extends through horizontal openings 35 in each body section 10 to pass through the recesses 18. Slots or elongate openings 36 are provided in the members 32 to pass or receive the pins 34 with clearance. The pins 34 may be provided with heads and may be removably locked in place by means of keys 37, or the like. The ends of the openings 36 are adapted to engage the pins 34 to limit the movement of the members 32. With the construction just described the assembly of the members 32 comprising the gripping elements 12 are adapted to shift or rock in the recesses 18 about axes substantially coincident with the centers of curvature of the walls 19 so that their projecting inner edges may assume vertical positions to properly cooperate with the pipe P in the event that the bushing B is worn or the rotary table is not properly horizontal.

The outer faces or edges of the members 32 comprising the gripping elements 12 are provided with gripping parts or teeth 38 for engaging the pipe P. In the case illustrated in the drawings, the wickers or teeth 38 are cut or formed directly on the forward edges of the members 32 and the teeth 38 of the several members 32 comprising each gripping element 12 are normally in horizontal or transverse alignment. The teeth 38 are sharpened having substantially horizontal upper sides and downwardly and rearwardly inclined lower sides joining at sharp edges. The teeth 38 on the inner edges of the members 32 are substantially cylindrically curved or concaved to properly cooperate with the surface of the pipe P. The teeth 38 of the members 32 are adapted to have effective gripping and supporting engagement with the pipe P extending through the bushing B.

Figs. 6 and 7 of the drawings illustrate another embodiment of the invention. The slip section 10ª illustrated in Figs. 6 and 7 of the drawings may be identical with the slip section 10 described in detail above. The section 10ª has a recess 18ª in its inner side. The recess 18ª has flat vertical side walls and a curved inner wall 19ª. In the case illustrated the inner wall 19ª of the recess is cylindrically concaved. The curvature of the wall 19ª is preferably uniform or regular and the wall 19ª preferably extends to the mouth of the recess at its upper and lower ends. It is to be understood that the slip section 10ª may be connected with a similar section 10ª by the means 11 or other suitable means to comprise a slip for use in the bushing opening O.

The embodiment of the invention illustrated in Figs. 6 and 7 of the drawings includes a self-adjusting and self-aligning pipe gripping element 12ª having an integral or one-piece body 50. The body 50 is shaped to operate in the recess 18ª of the section 10ª. The body 50 has flat parallel sides 51 and a curved inner surface 52. The sides 51 of the body 50 are adapted to shiftably cooperate with the side walls of the recess 18ª. The body surface 52 is curved to shift or move on the recess wall 19ª. Where the recess wall 19ª is concave, as illustrated, the surface 52 is complementary or convex to conform to and evenly bear on the wall 19ª. The engagement of the surface 52 with the wall 19ª allows the gripping element 12ª to rock or move about a substantially horizontal axis. Means is provided for limiting movement of the gripping element 12ª and for retaining the element in the recess 18ª. In the typical preferred structure illustrated, a pin 53 is removably arranged in openings 54 in the slip section 10ª and extends through a transverse slot or opening 55 in the gripping element body 50. The opening 55 is elongate to allow the required rocking movement of the element 12ª in the recess 18ª.

If desired, wickers or gripping teeth may be formed directly on the body 50 of the gripping element 12ª to grip the pipe. In the drawings I have illustrated a replaceable gripping part 56 on the active face of the body 50. The gripping part 56 covers the active face of the body 50 and is suitably secured to the body. The means for removably securing the gripping part 56 to the body 50 may include ribs or tongues 57 on the gripping part cooperating with grooves 58 in the body 50. Screws 59 are passed through openings in the gripping part 56 and its tongues 57 and thread into openings 60 in the body 50. The heads 61 of the screws 59 are preferably countersunk in the outer face of the gripping part 56. The gripping part 56 projects from the inner surface of the slip section 10ª and has a concave face for conforming to the pipe or tubing handled by the slips. Wickers or gripping teeth 62 are provided on the gripping part 56 to cooperate with the pipe or tubing. The teeth 62 are sharpened and shaped to have effective gripping and holding engagement with the pipe. It is to be understood that the body 50 may be provided with gripping parts 56 to adapt the slip for gripping pipe and like objects of different diameters or sizes.

It is believed that the operation of the improved slips shown in Figs. 1 to 5 will be understood from the foregoing detailed description. In operation, the slips S may be handled by means of the handles H and may be readily inserted in the bushing opening O to engage about and support the pipe P. The sections 10 of each slip S are connected by the means 11 so that they may have limited independent movement to properly seat on and conform to the wall of the opening O. The gripping elements 12 project from the inner sides 17 of the body 10 to engage the pipe P. The elements 12 may shift or rock in the recesses 18 about substantially horizontal axes and this freedom of movement allows the elements 12 to automatically assume positions where their active faces properly engage the pipe P. In instances where the opening O in the bushing B is worn or irregular and in instances where the rotary table is not truly horizontal, the elements 12 may rock and assume positions where their active faces are truly vertical to conform to the vertical pipe P. Thus the gripping elements 12 are self-adjusting or self-aligning and properly conform to and engage the pipe P throughout their lengths.

The gripping elements 12 comprising laminated assemblies of the members 32 are simple and inexpensive of manufacture. As the gripping forces are evenly distributed over the surface of the pipe P the teeth 38 do not score or cut grooves in the pipe. The form of the invention illustrated in Figs. 6 and 7 of the drawings has the same operation as the embodiment shown in Figs. 1 to 5. The gripping elements 12ª of the slip shown in Figs. 6 and 7 may be easily reconditioned by providing them with new or sharpened gripping parts 56. The form of slip shown in Figs. 6 and 7 may be adapted to handle or grip pipe of different diameters by providing them with gripping parts 56 of different thicknesses. The bodies 50 of the gripping parts are simple, integral members and as they do not receive wear through gripping the pipe, are long wearing.

Having described only typical preferred forms and applications of my invention, I do not wish to be limited or restricted to the specific details herein set forth, but wish to reserve to myself any variations or modifications that may appear to those skilled in the art or fall within the scope of the following claims:

Having described my invention, I claim:

1. A slip for arrangement in a tapered opening including a body section having a downwardly and inwardly inclined outer surface to seat in the opening, a pipe gripping element carried at the inner side of the body section, and cooperating surfaces on the body section and element supporting the element to rock about a substantially horizontal axis whereby it may assume a position to evenly cooperate with a pipe.

2. A slip for arrangement in a tapered opening including a body section having an inclined outer surface to seat in the opening and having a recess in its inner side, and a pipe gripping element cooperating with the wall of the recess to be shiftable vertically therein about a substantially horizontal axis whereby it automatically conforms to a vertical pipe.

3. A slip for arrangement in a tapered opening including a body section having a downwardly and inwardly inclined outer surface to seat in said opening and having a recess in its inner side with a concave wall, and a pipe gripping element arranged in the recess and having a convex surface shiftably engaging said wall whereby the element is operable to shift about a substantially horizontal axis to evenly cooperate with a vertical pipe.

4. A slip for arrangement in a tapered opening including a body part having a downwardly and inwardly inclined outer surface to seat in said opening and having an opening in its inner side, a vertically disposed gripping element arranged in the opening of the body part to rock about a substantially horizontal axis and projecting from the opening of the body part to have gripping engagement with a pipe, and means for limiting movement of the gripping element.

5. A slip for arrangement in a tapered opening including a body part having a downwardly and inwardly inclined outer surface to seat in said opening and having a longitudinally extending opening in its inner side, a longitudinally disposed gripping element shiftable longitudinally in the opening of the body part about a substantially horizontal axis whereby it may assume a position where its active face may evenly grip a vertical pipe.

6. A slip for arrangement in a tapered opening including a body part having a downwardly and inwardly inclined outer surface to seat in said opening and having a longitudinally extending opening in its inner side, an elongate gripping element vertically disposed in the opening of the body part and rockable therein to be self-adjusting through engagement with a pipe, and gripping parts on the inner side of the element for gripping the pipe.

7. A slip for arrangement in a tapered opening including a body part having a downwardly and inwardly inclined outer surface to seat in said opening and having a longitudinally extending opening in its inner side, the inner wall of the opening in the body part being concave, an elongate vertically disposed gripping element in the opening of the body part and having a convex surface shiftable on said wall whereby the element may rock in the opening, and means for preventing displacement of the gripping element from the opening of the body part.

8. A slip for arrangement in a tapered opening including a body part having a downwardly and inwardly inclined outer surface to seat in said opening and having a recess in its inner side, the inner wall of the recess being concave, a gripping element in the recess having a convex surface shiftable on said wall whereby the element is rockable in the recess, and a toothed pipe engaging part removably secured to the gripping element.

9. A slip for use in a tapered opening of a rotary table bushing including two body sections for arrangement in the opening of the rotary table bushing and having downwardly and inwardly inclined outer surfaces for seating in the opening, means connecting the sections for limited relative movement whereby they may conform to the bushing opening, and a gripping element carried by each section to rock into even cooperation with a vertical object extending through the bushing.

10. A slip of the character described for arrangement in the tapered opening of a rotary table bushing, said slip including, two body sections having downwardly and inwardly inclined outer surfaces for seating in the bushing opening, means connecting the sections for limited relative movement whereby they may conform to the bushing opening, each section having a recess in its inner side, the inner walls of the recesses being concave, and gripping elements in the recesses shiftable on said walls to rock into even cooperation with a vertical object extending through the bushing.

11. A slip for arrangement in the tapered opening of a rotary table bushing comprising, a body section having a downwardly and inwardly inclined outer surface to seat in said opening and an inner surface curved about a substantially horizontal axis, and a gripping element at the inner side of the body section having a curved surface substantially conforming to and shiftably cooperating with the said inner surface to shift about a substantially horizontal axis.

12. A slip for arrangement in the tapered opening of a rotary table bushing comprising, a body section having a downwardly and inwardly inclined outer surface to seat in said opening and an inner cylindric surface curved about a substantially horizontal axis, and a gripping element at the inner side of the body section having a curved surface substantially conforming to and shiftably cooperating with the said cylindric surface to shift about a substantially horizontal axis.

13. A slip for arrangement in the tapered opening of a rotary table bushing comprising, a body section having a downwardly and inwardly inclined outer surface to seat in the bushing opening and having a recess in its inner side, said recess having substantially parallel side walls and an inner wall curved about a substantially horizontal axis, and a gripping member in the recess having substantially parallel sides and a curved surface conforming to and shiftable on said inner wall whereby the member may rock about a substantially horizontal axis.

14. A slip for arrangement in the tapered opening of a rotary table bushing comprising, a body section having a downwardly and inwardly inclined outer surface to seat in the bushing opening and having an inner surface curved about a substantially horizontal axis, and a gripping element shiftably cooperating with said inner surface to move about a substantially horizontal axis relative to the body section.

GEORGE E. McLAGAN.